US006168352B1

(12) United States Patent
Chen et al.

(10) Patent No.: US 6,168,352 B1
(45) Date of Patent: Jan. 2, 2001

(54) APPARATUS FOR PRODUCING HIGH DENSITY SLURRY AND PASTE BACKFILLS

(75) Inventors: Long Jin Chen; Daniel G. Millette; Alfred Annor, all of Sudbury (CA)

(73) Assignee: Her Majesty the Queen in right of Canada, as represented by the Minister of Natural Resources, Ottawa (CA)

( * ) Notice: Under 35 U.S.C. 154(b), the term of this patent shall be extended for 0 days.

(21) Appl. No.: 09/223,835

(22) Filed: Dec. 31, 1998

Related U.S. Application Data

(63) Continuation-in-part of application No. 08/786,965, filed on Jan. 24, 1997, now Pat. No. 5,888,026.

(51) Int. Cl.[7] .......................... B01D 21/02; B01D 21/24; B01D 21/30; B01D 29/085; B01D 29/60

(52) U.S. Cl. .......................... 405/266; 210/205; 210/803

(58) Field of Search .................................... 405/263–268; 210/198.1, 205, 220, 738, 803, 410, 411, 532.1, 534

(56) References Cited

U.S. PATENT DOCUMENTS

| | | | |
|---|---|---|---|
| 2,283,365 | 5/1942 | Heinkel | 137/328 |
| 2,861,694 | 11/1958 | Katow et al. | 210/534 |
| 3,168,470 | 2/1965 | Rhoda | 210/239 |
| 3,306,446 | 2/1967 | Lewis | 210/114 |
| 3,406,830 | 10/1968 | Greensmith | 210/241 |
| 3,693,795 | 9/1972 | Robinson et al. | 210/804 |
| 3,718,003 | 2/1973 | Cook et al. | 405/129 |
| 3,852,967 | 12/1974 | Stewart et al. | 405/128 |
| 3,869,384 | 3/1975 | Schutte | 210/703 |
| 3,901,811 | 8/1975 | Finch | 210/538 |
| 3,965,013 | 6/1976 | Jackson | 210/519 |
| 3,979,290 | 9/1976 | Loffler | 210/745 |
| 4,019,327 | 4/1977 | Kempster | 405/264 |
| 4,059,963 | 11/1977 | Wayment | 405/267 |
| 4,101,333 | 7/1978 | Wayment | 106/811 |
| 4,209,404 | 6/1980 | Yoshida | 210/225 |
| 4,273,650 | 6/1981 | Solomon | 210/104 |
| 4,504,397 | 3/1985 | Matthews | 210/804 |
| 4,541,850 | 9/1985 | Oda et al. | 210/519 X |
| 4,579,659 | 4/1986 | Eades et al. | 210/541 |
| 4,634,526 | 1/1987 | Salkeld et al. | 210/194 |
| 4,836,937 | 6/1989 | Homer | 210/808 |
| 4,867,872 | 9/1989 | Russell et al. | 210/104 |
| 5,405,063 | 4/1995 | Chen | 222/494 |
| 5,670,045 | 9/1997 | Schaller | 210/540 |

FOREIGN PATENT DOCUMENTS

| | | |
|---|---|---|
| 1122537 | 4/1982 | (CA) . |
| 2006928 | 12/1989 | (CA) . |
| 2129048 | 2/1993 | (CA) . |
| 2118847 | 3/1994 | (CA) . |
| 2009905 | 8/1994 | (CA) . |
| 3529682 | 3/1987 | (DE) . |
| 19539684 | 4/1991 | (DE) . |
| 4104282 | 8/1991 | (DE) . |
| 0403784 | 12/1990 | (EP) . |

*Primary Examiner*—Eileen D. Lillis
*Assistant Examiner*—Tara L. Mayo
(74) *Attorney, Agent, or Firm*—Jones, Tullar & Cooper PC

(57) ABSTRACT

An apparatus for producing high density slurry and paste backfills for use, for example, in mining operations. The high density slurry or paste is produced from a mill tailings mixture in a silo which includes a percolation and decant apparatuses for percolating water out of the mill tailings mixture and for decanting clarified water from atop the settled tailings. While settling occurs, air is introduced from the bottom of the silo to agitate the mixture to ensure substantially homogeneous settlement of the solids. Once settled, the resultant high density slurry or paste is fluidized by air in order to give the paste more readily flowable characteristics.

47 Claims, 8 Drawing Sheets

APPARATUS FOR PRODUCING HIGH DENSITY SLURRY AND PASTE BACKFILLS

This application is a continuation-in-part of application Ser. No. 08/786,965 filed Jan. 24, 1997, now U.S. Pat. No. 5,888,026 and entitled "Backfill Paste Production Facility and Method and Apparatus for Producing High Density Slurry and Paste Backfills".

FIELD OF THE INVENTION

The invention relates to a method and apparatus for producing high density slurry and paste backfills for use in mining operations and to backfill paste production facilities which incorporate the aforesaid method and apparatus.

BACKGROUND OF THE INVENTION

There are many different reasons for using backfilling in mines and not only to the benefit of the environment. In some cases, creating an opening underground poses no problem other than with the disposal of waste materials. However, in most types of rock, when an opening is created, it causes stress realignment around the opening. This not only creates problems with spalling and rock falls during rockbursts but also limits the size of the opening that can be made.

Some of the reasons backfill is used in mines (not in any specific order):

(a) to keep highly stressed rock around an opening from spalling. Spalling not only dilutes the ore but it can cause hazards in stopes where people are working;

(b) to keep negatively stressed rock (in tension) around an opening from coming loose for the same reasons in (a) above;

(c) to absorb some of the excess stresses in order to minimize damage from rockbursting;

(d) to act as pillars in some types of mining to permit removal of more ore;

(e) as a working platform for personnel and equipment in undercut and fill operations;

(f) to prevent surface subsidence in shallow mines or soft rock mines;

(g) to alleviate environmental hazards associated with surface disposal of waste materials; and (h) to dispose of large quantities of mining wastes underground.

Various traditional materials have been used for backfill, the choice of which is usually dependent upon the reason for backfilling and on cost. Some of the materials include but are not limited to:

(a) cemented rockfill (stiff fill);

(b) uncemented esker sand;

(c) gravel;

(d) uncemented classified mill tailings (cycloned to separate the very fine particles or slimes) and unclassified (total tailings) in hydraulic form (40% to 55% solids content);

(e) cemented classified and unclassified mill tailings in hydraulic form; and (f) a combination of esker sands and classified and unclassified tailings.

With the growing environmental concern for tailings disposal on surface, there has been a growing interest in using the tailings for mine backfill whether or not backfill is necessary for ground control purposes. Mill tailings have traditionally been used for backfilling of mines but usually in a classified form. Once classified, the finer portion of the material (slimes) was then sent to the surface disposal site or tailings pond. However, in recent years, mine operators have seen the need to dispose of their total tailings in the form of backfill.

The use of hydraulic tailings fill entails considerable preparation before the filling of the opening can commence. First a bulkhead must be constructed which will hold back the hydraulic mass while allowing water to percolate out of the fill. In some larger mines, drainage pipes such as extruded plastic weeping tile are hung from the top of the stope and brought together under the bulkhead. If a large stope is being filled, a plug is often poured first with a higher cement content (up to 30%) to just above the bulkhead. When the plug is set, the remainder of the stope is filled with the weaker cemented fill (normally around 10% cement). Such extensive preparation is costly in terms of both time and capital.

Another major cost associated with the use of hydraulic backfill is the water that leaches out of the fill mass must be pumped back up to surface. If the mining method used calls for mining to progress against the backfill, sufficient time must be allowed for the fill to drain and cure which can typically be on the order of from 28 to 56 days.

As alternatives to hydraulic fill, high density slurry or paste backfills may be used. High density slurry is simply a thicker hydraulic fill. It has a solids content in the range of 60% to 70% rather than the 40% to 55% range of hydraulic fills. The lower water content requires less extensive bulkhead construction, exhibits faster percolation times, requires less water to be pumped back up to the surface, and requires less cement to achieve the same strength as hydraulic fill.

Paste backfill is an even higher density tailings material in the range of 76% to 84% solids content, depending on the size gradation of the material. By definition, a paste is a material that does not exude water after it has been placed. Such a material has many benefits when used as a backfill in that it does not require water to pumped back up to the surface, lighter or even no bulkhead construction, much less time to resume mining, and it only uses 1.5% to 3% cement. The main drawback in the use of pastefill is that due to its consistency, it is difficult to transport.

Prior Art High Density Slurry/Paste Fill Systems

Currently known systems used to thicken hydraulic tailings slurry to a higher density or paste employ commercially available drum filters, thickeners and/or blend the slurry with alluvial sand to produce paste. While the sand is used in the process to try to achieve a higher strength due to the particle size of the sand, excavation of alluvial sand raises environmental issues.

The thickener system starts out with the tailings in a storage silo. From the storage silo, the tailings are dumped into the thickener. Once the mixture has thickened sufficiently, it is dumped to a mixer where cement is added. After mixing, the resultant backfill material is either pumped or gravity fed to the underground stopes. This thickener system prepares paste in batches as it takes time to remove the water in the thickener. Therefore, if a continuous backfilling system is required, two tailings storage silos and two thickeners are required. The main drawbacks associated with this system are that the thickeners are very costly, i.e. up to $1,000,000 each; being mechanical devices, they require a high level of maintenance; due to the various factors which can affect the thickening process, the fill plant operator must be consistent in judging the release time of the fill from the thickener; thickeners are large and require considerable floor space; and the energy costs to operate such thickeners are relatively high.

The drum filter system begins thickening in the same way, with hydraulic tailings coming from a storage silo. The slurry is fed from the silo to one or more drum filters. These filters use a permeable membrane and air to remove most of the water from the slurry, leaving a cake of tailings (filter cake) on the drums. The actual paste production involves re-pulping the filter cake by adding a controlled amount of water and cement and mixing to obtain the proper consistency. The material is then poured or pumped from the mixer to the stopes.

While the initial cost of a drum filter system is much lower than that of a thickener, the drum filter system still suffers from some major disadvantages which include the large floor space required for the storage of the filter cakes; personnel required to handle the cake between filter, storage and the re-pulping process; the maintenance costs of the filters; and the fact that the operator has less control due to the handling required and the resulting extra personnel involved.

SUMMARY OF THE INVENTION

The present invention overcomes the aforementioned drawbacks and disadvantages by providing an integral containment vessel and high density slurry or paste producing unit which accepts the mill tailings and processes them into a backfill paste ready to be mixed if desired with a setting agent for use as a backfill in mining operations.

As the mine tailings slurry enters the vessel, it immediately begins a settling process. This process, by gravity settling alone, normally requires 24 to 48 hours. Due to the fine nature of the material it is very slow to settle and must be agitated to avoid uneven settling of particles and to produce a homogeneous end product. While it is known to use water jets to agitate slurries, with water jets, the settled tailings are fluidized in the bottom of the vessel, rat-holing frequently occurs due to plugging nozzles and insufficient local fluidization, and the addition of water is counter-productive and limits the maximum pulp density (solids content) of the end product.

In the present invention, while the slurry is being dewatered, air is injected into the slurry to fluidize the settled tailings. Solid particles are fully fluidized by the air from the bottom to the top of the vessel, resulting in a paste with uniform particle size distribution and viscosity. The fluidized paste is pumpable and the paste in the vessel can be made to flow under the influence of gravity in a smooth and stable manner. Furthermore, it has been found that it is possible to obtain even higher pulp densities by fluidizing tailings settled in the silo as compared with gravitational settling methods.

In normal operations, the output of tailings from the mill is approximately 30% solids, the remainder is water. To achieve a paste backfill, the slurry must be thickened to between 67% and 87% solids, depending on the particle size distribution and the specific gravity of the incoming material, thus requiring a substantial amount of the water to be removed. By speeding up the removal of water, the length of time for the overall process can be reduced substantially.

In order to increase the rate at which water is removed from the mill tailings, a combination of decanting and percolating of the water in the slurry material is effected. During initial settling of the material, particulate material gravitates to the bottom of the vessel leaving clearer water with low solids content at or near the top which is decanted. Due to hydraulic forces and the weight of solids above, further water in the material is exuded in the lower levels. This percolated water is also removed until a predetermined solids density has been attained. Left to nature, a graduated mass would form in the vessel since the coarser material tends to settle first. In order to achieve a homogeneous paste, the material is agitated with air introduced through nozzles located in the lower portion of the vessel. The air also acts to fluidize the material such that it may be readily removed from the vessel once it has become a uniformly-graded paste.

In order to achieve this, there is provided in one embodiment of the present invention a novel device which will be referred to herein as a percolation/decant insert. The percolation/decant insert, as the name implies, is a dual purpose unit which allows the water in the slurry to percolate into the device during settling and also decants the water left on top of the solids as a result of the settling. As the solids settle in the silo, clear water is left on the surface. Rather than manually inserting a suction hose to pump this water or waiting for the solids to discharge and pouring the water out later, it can be removed, i.e. decanted, during the process. In general, the percolation/decant insert comprises a screen portion through which water in the slurry can percolate, a variable height decant portion atop the screen portion through which the clearer water at the surface of the slurry can be decanted, and means for removal of the decanted and/or percolated water.

The use of the percolation/decant insert increases the dewatering rate significantly as compared with a similar vessel utilizing a combination of gravity settling and drawing off of clarified liquid. Not only is the thickening time considerably reduced, since the throughput of the vessel can thereby be significantly increased, vessel sizes can be comparatively smaller and still out-produce conventional gravity settling vessels in paste production. It has also been found that the final product can be made up to 5% more dense than with conventional methods.

While the operating containment vessels may be newly constructed, since most mining operations already have in place existing storage silos for receiving and dispensing the hydraulic tailings material the elements of the present invention may be readily adapted for implementation therein.

The primary advantages in using such a system is that the process can take less than 25% of the normal time required to densify tailings; no additional buildings or other such structures are required for the plant if holding silos already exist; due to the very few mechanical components, less maintenance is required; the system is compact and uses only slightly more floor space than required for the silo(s); the system is easily expandable, because of its modular nature. e.g., a 2 silo continuous system can have its capacity increased 50% by the addition of one more silo; the system is readily completely automated; there are comparatively very low manufacturing and installation costs as compared with present options; and the system requires very little energy to operate.

The present invention also relates to a method for producing high density slurry or paste backfill which method is embodied to a certain extent in the manner in which the aforementioned apparatus functions. The invention further includes a high density slurry or paste backfill production facility which incorporates the novel integral containment vessel and high density slurry or paste producing unit.

In another embodiment, the integral high density slurry or paste production unit is provided with separate decant and percolation apparatuses. The decant apparatus comprises a decant screen and an associated launder tray disposed along the periphery of a feed cone positioned at the upper end of the silo. The feed cone is intended to speed settling and provide clearer decant water. A greater area for decanting is provided by placing the decant screen around the circumference of the feed cone, thereby speeding the decanting. The feed cone incorporates a feed well which permits the introduction of slurry material centrally with respect to the silo. More importantly, the feed well introduces the fresh slurry below the surface of the settling slurry during decanting to minimize turbulence and mixing with the clarified water to be decanted, thereby further expediting that stage of the dewatering process. By providing a additive input line in association with the feed well, various chemical additives, flocculents, dispersants, etc. may be diffused into the slurry at the time of its input.

The percolation apparatus of the second embodiment is provided in openings in the walls of the vessel instead of centrally as in the first embodiment. This allows a much greater area for water percolation and facilitates maintenance. A plurality of percolation screens, each mounted in a frame and supported by an enclosure, are disposed spaced-apart in the silo walls. Water which percolates through the percolation screens is drained through a water discharge outlet located in the enclosure.

Both the percolation screens and the decant screens of the second embodiment are provided with means for removing particles that become lodged in the screen passages. Preferably, vibrating pneumatic hammers are provided which, when operated, shake the screen, thereby dislodging trapped particles.

These and other features of the invention will become apparent from the detailed description set out hereinbelow and the accompanying drawings in which:

DESCRIPTION OF THE INVENTION

Figure 1:
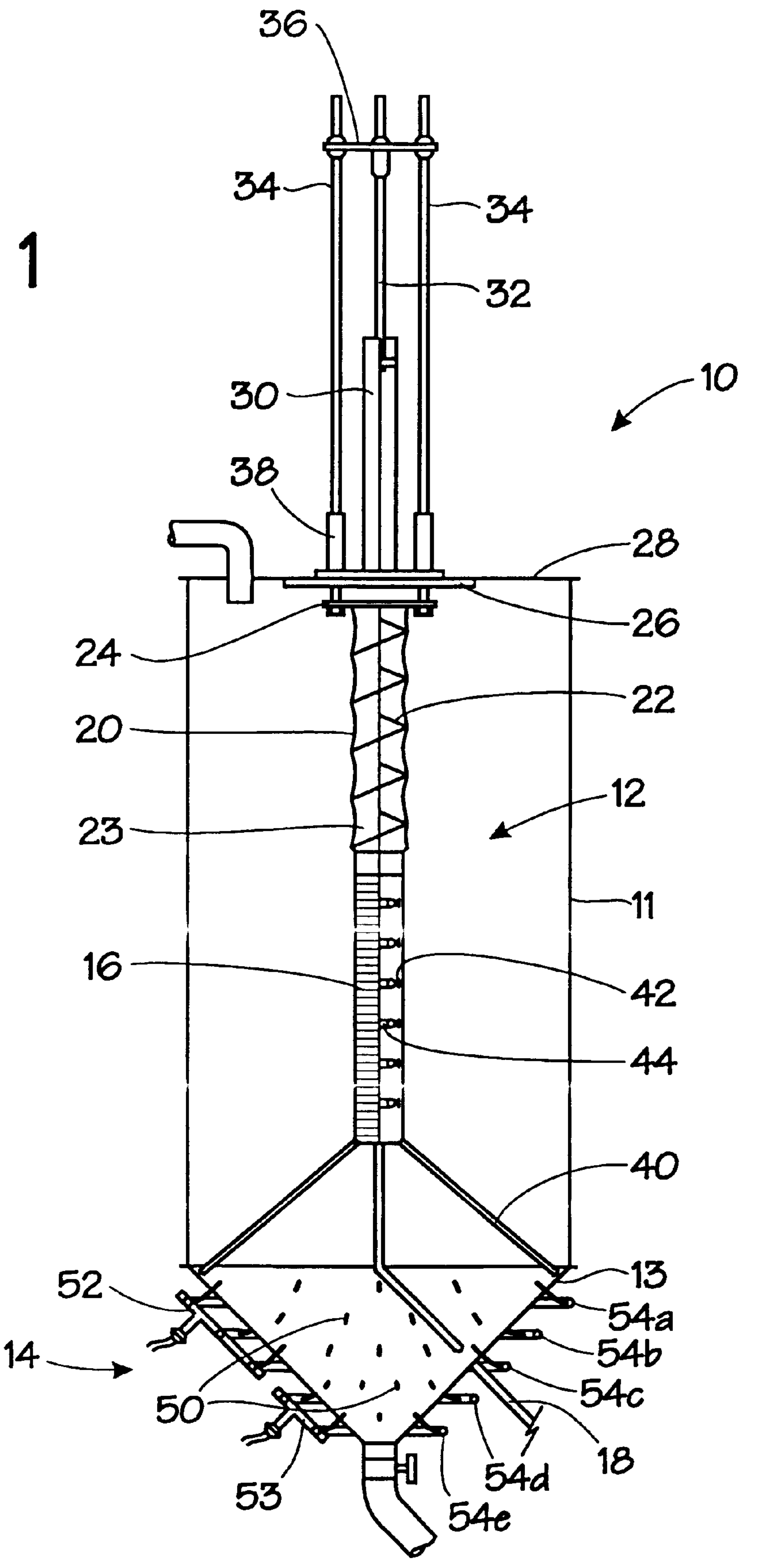
FIG. 1 is a side elevation of the integral containment vessel and high density slurry or paste producing unit according to a first embodiment of the invention, partially broken away to reveal the percolation/decant insert and the interior and exterior features.

Referring now to FIG. 1, there is shown an integral containment vessel and high density slurry or paste producing unit 10, comprising in this case a silo 11 fitted with a percolation/decant insert 12 and an air fluidization/agitation system 14. The silo 11 shown includes a conical bottom 13, but may have a hemispherical or other shaped bottom.

The percolation portion of the device is a custom built water-well screen 16. These screens preferably consist of a cylindrical, vertical, stainless steel framework with bands of stainless steel wrapped around the framework and machine welded. A specified gap is left between the bands (for example, a #8 screen has a 0.008" gap). The porosity of the screen or screen number used depends on the size of the material being settled.

A conduit 18 at the bottom of the percolation screen 16 allows water which percolates through the screen to be removed from the vessel by means of gravity. Alternately, a stainless steel submersible pump could be placed in the bottom of the percolation screen 16 and connected to a current sensing switch. When there is sufficient water in the screen 16, the pump will activate and pump the water out of the silo and back to the original process for reuse.

Above the screen 16 is the decant portion 20 of the device. In general, the decanter 20 is an adjustable length conduit which extends above the screen 16. In the first embodiment, a light coil spring 22 is attached at one end to the top of the percolation screen 16 and the other end to an annular plate 24. The plate 24 has an aperture through which the surface water may be decanted. The spring 22 is covered preferably with a ½" thick, rubber-like material 23, such as LINATEX™ brand.

The annular plate 24 may be raised and lowered by any form of suitable activation means. As shown in FIG. 1, a pneumatic or hydraulic cylinder 30 is used as the activation means for the decanter 20. A pneumatically operated system is actually preferred since a source of compressed air is already needed for use with the agitation/fluidization system 14. The pneumatic cylinder 30 is mounted by way of a mounting plate 26 to the upper closure 28 of the silo 11. The cylinder piston 32 is attached to a series of connecting rods 34 through upper frame 36. The connecting rods 32 extend through bushings 38 and through the upper closure 28 and mounting plate 26 to connect with the annular plate 24. Thereby, activation of the cylinder 30 causes piston 32 to move and, hence, causes the annular plate 24 to be raised or lowered accordingly via the connecting rods 34. Lowering of the height of the annular plate 24 will allow the clear water on top of the solids to decant into the percolation screen. This water is removed from the bottom of the percolation screen in the same manner as the percolation water.

To provide additional support and stability to the percolation/decant insert, support members 40 may be provided between the percolation screen 16 and the sides or bottom of the silo 11.

Depending on the nature of the tailings being thickened, it may be necessary to periodically remove debris and other fine particles which accumulate on the screen 16. To this end, there may be provided within the screen a plurality of air nozzles 42 which can blow air through the screen to dislodge any accumulation and to prevent the screen 16 from plugging with fine particles. Advantageously, the air for these air nozzles 42 can be provided from the same source that is used to drive the pneumatic cylinder 30. The air is supplied to the air nozzles 42 through a plurality of air manifolds 44 that encircle the interior of the screen 16. The air is alternately supplied to these manifolds through a rotating air valve (not shown).

At the bottom 13 of the silo 11, there is located the agitation/fluidization system 14. This system 14 includes a plurality of nozzles 50 disposed in the lower end of the silo 11 to provide air injection for both agitation of the settling tailings and fluidization of the thickened product to assist with its removal from the vessel In the arrangement shown in FIG. 1, the nozzles 50 extend into the silo 11 and are supplied air by exterior manifolds 52, 53. An exterior arrangement of the agitation/fluidization system 14 facilitates maintenance and repair thereof without necessarily having to remove the contents of the silo. As shown in FIG. 1, the nozzles 50 are arranged in a series of concentric rings 54*a*, 54*b*, 54*c*, 54*d* and 54*e* to ensure complete agitation and fluidization of the contents of the silo.

Figure 2A:
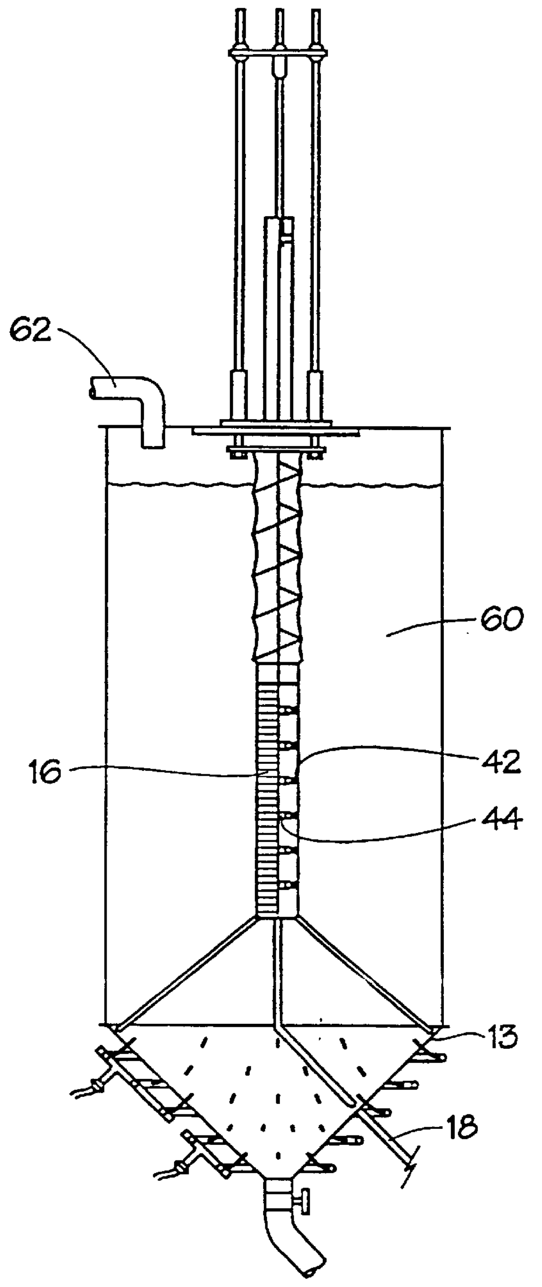
FIGS. 2*a* and 2*b* are side elevations of the integral containment vessel and high density slurry or paste producing unit as shown in FIG. 1 and illustrating the operation of the percolation/decant insert.
Figure 2B:
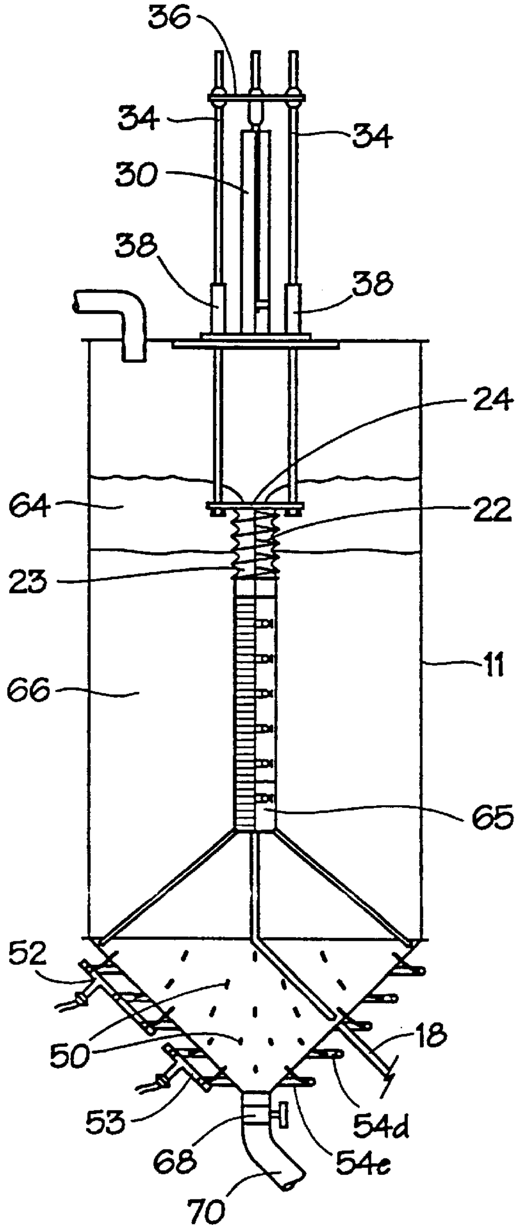

FIGS. 2*a* and 2*b* illustrate the operation of the percolation/decant insert. The mill tailings slurry 60 (usually between 20–30% pulp density) enters the top of the silo 11 through inlet conduit 62 and begins to settle toward the bottom 13. The stainless steel screen 16 allows water in the material 60 to percolate through the screen slots while holding back the fine particles. The water then exits by means of gravity through conduit means 18 or via the a pump, if provided. The consistency of the mill tailings 60 is similar to silt, therefore they tend to quickly plug the slots in the screen. The screen 16 is cleaned periodically by means of the plurality of air nozzles 42 attached to the plurality of air manifolds 44 that encircle the interior of the screen 16.

When sufficient settling has taken place and there remains a layer of clear water 64 on top of the densified tailings 66 (see FIG. 2*b*), the pneumatic actuator 30 is retracted. This pulls down on upper frame 36, which in turn exerts a downward pressure on connecting rods 34, pushing them through bushings 38. This results in the annular plate 24 being translated in a downward direction. With its downward travel, spring 22 is compressed, folding the rubber-like covering 23, and allowing the clarified water 64 to decant through the aperture in the annular plate 24, when the height of the plate 24 is below the surface level of the water 64 in the silo 11. The water 65 which is decanted falls under influence of gravity to the bottom of the percolation screen 16 where it exits through the conduit means 18 or by way of the pump, if provided.

By simply letting a tailings material settle in a silo, the larger, heavier particles will settle first and the result is layers of progressively denser material. To ensure a homogenous mix, the tailings should be agitated until settling is completed. Agitation air is injected into the settling contents by means of the air nozzles 50 provided at the lower end of the silo 11.

Once the mine tailings have been densified and dewatered in the silo to anywhere from 76% to 84% solids, it is very difficult to remove from the silo. However, it has been found that the continued agitation of the slurry at higher densities causes a fluidization of the slurry/paste to occur. The result is a homogeneous, dense slurry being produced which behaves as a time-dependent non-Newtonian fluid and possesses good flow characteristics. In most cases, the thus fluidized densified slurry/paste will flow out of the vessel under the influence of gravity when the valve 68 on the outflow conduit 70 is opened (see FIG. 1).

It has also been found that by adding a small quantity of water to the fluidized tailings upon exit, the ability of the high density slurry/paste to flow is enhanced without overdilution. The water acts as a lubricant between the silo-bottom wall and the material inside. The water may be introduced via the nozzles on rings 54*d*, 54*e* through manifold 53 by simply switching the fluid source through valving (shown in FIG. 3). If required, both manifolds 52, 53 can be used to introduce the necessary minimum amount of water to induce the flow of the fluidized slurry/paste.

Preferably, nozzles 50 are of a non-plugging type. In the subject environment, most commercially available nozzles tend to plug when the fluid is switched off. The extremely fine particles present in mine tailings enter the nozzle orifice and harden. Quite often, when the fluid is switched back on, even at higher pressures, the particles do not dislodge. In this regard, the type of nonplugging nozzle disclosed in U.S. Pat. No. 5,405,063, issued Apr. 11, 1995 and assigned to the same Applicant as the subject invention, incorporated herein by reference, has been found to be particularly useful The nozzles that are used for agitation can be exactly the same nozzles as the fluidization nozzles.

The percolation/decant insert is designed to considerably reduce the thickening or dewatering time, thereby reducing the size requirement of the silos. As an example, a 3,000 ton silo of nickel tailings will take approximately 24 hours to gravity settle from a density of 35% solids to a density of 75% solids. Once settled, the silo contains approximately 2,000 tons of densified material while the remainder is water, thus allowing about 85 tons/hr of material until the next silo is sufficiently settled.

Designing a plant using the percolation/decant insert to obtain 85 tons/hr would only require a 500 ton silo as compared to the 3,000 ton unit in the example above, as the densification time is reduced as well as the usable capacity of the silo.

Figure 3:
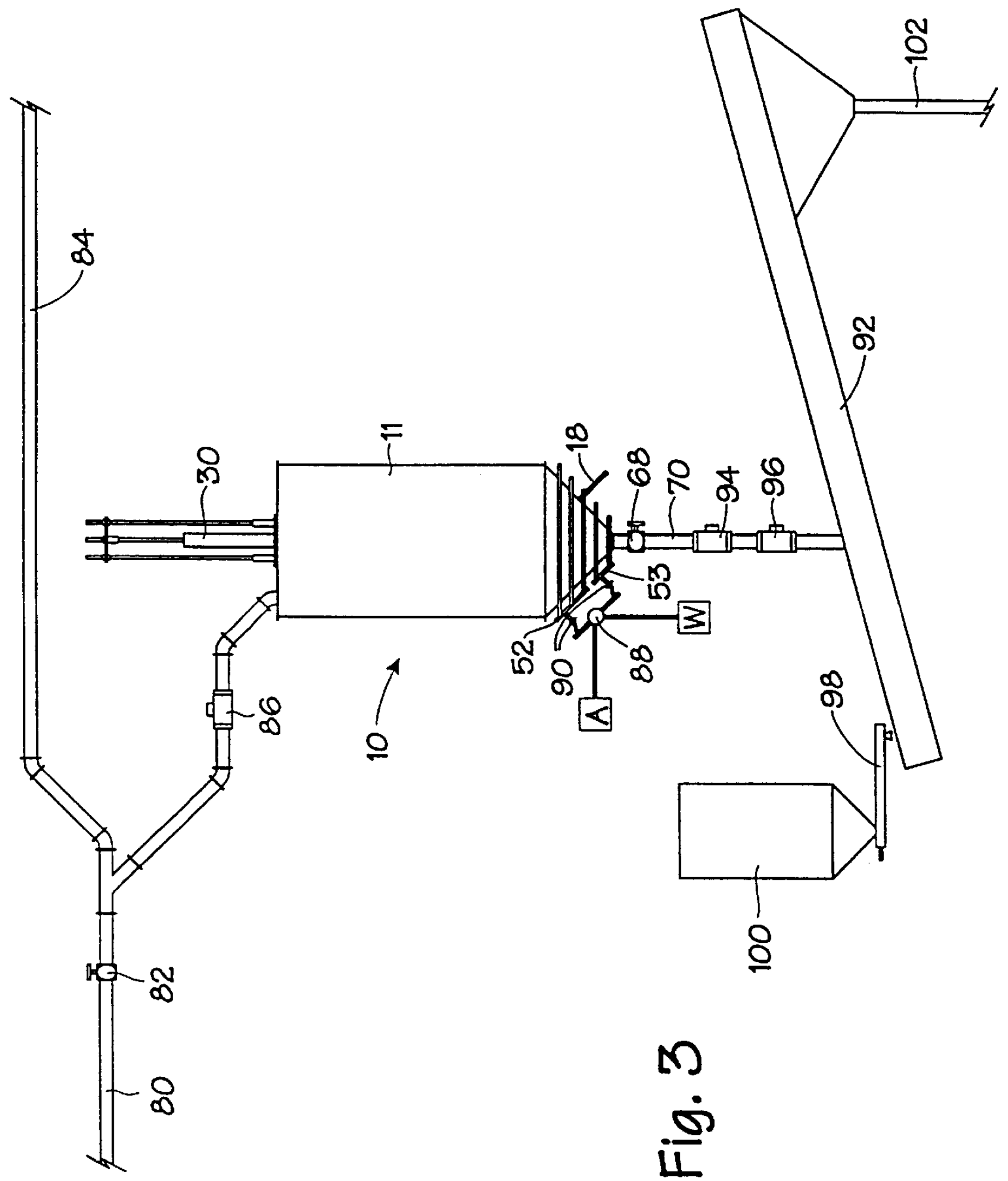
FIG. 3 is a schematic diagram of a high density slurry or paste backfill production facility shown incorporating the first embodiment of the integral containment vessel and high density slurry or paste producing unit.

FIG. 3 illustrates a high density slurry/paste production facility which employs the aforementioned integral containment vessel and high density slurry or paste producing unit 10. A dilute tailings slurry from the mill enters the system through conduit means 80 to selector valve 82. The selector valve 82 is used to direct the slurry to either the silo 11 or on to a surface disposal site via conduit means 84. If a second silo (not shown in FIG. 3) is included in the system, valve 82 and conduit means 84 would direct the material to the second silo. The quantity of slurry entering the silo 11 is measured in terms of flow rate and total flow by means of a flow meter 86.

Silo 11 has a preferred geometry: the height of the tank portion being about twice the diameter, with a conical bottom having a 45° slope. Once the tailings slurry (usually between 20–30% pulp density) enters the silo 11, air from source A is introduced via valve 88 and metering valves 90 through the nozzle manifolds 52, 53 and enters the silo 11 through the plurality of nozzles 50 to agitate the settling material The placement, vertical and horizontal angles of nozzles has an effect on the agitation and fluidization processes, and their particulars depend on the size of the silo and the specific gravity of the tailings material.

While the tailings material is settling, percolation screen 16 allows percolated water to exit the silo via conduit means 18 (as shown in FIG. 2*a*). Air nozzles 42 blow air through the screen 16 to keep the screen from plugging with fine particles. Once the material has dewatered for a specified time to bring the pulp density to between 76% and 86% solids, again depending on the specific gravity and particle size distribution of the material as well as the desired consistency of the final product, the water that has collected on top of the paste is decanted by actuating the ram 30 on the percolation/decant insert and allowing the water to exit the silo by conduit means 18.

Now that a paste or high density slurry exists in the silo 11, it is necessary to fluidize the material to allow it to exit. Fluidization of tailings by air in a viscous medium is affected by a number of factors, such as particle size, water content in settled bed, flow velocity and fluidizing time. Air from source A and, if desired, water from source W are introduced through control valve 88 into supply manifolds 52, 53 and through the plurality of nozzles 50 (not shown in FIG. 3 because of the scale of the drawing) which urges the paste to exit the silo 11 via outflow conduit 70 once valve 68 has been opened.

On its voyage to screw mixer 92, the pulp density of the material is monitored by density meter 94. Flow meter 96 measures the quantity of material entering mixer 92 as well. By calculation, the information from density meter 94 and flow meter 96 is used to determine the feed rate for cement as controlled by weigh feeder 98 mounted directly below cement hopper 100.

When the paste and cement reach the upper end of screw mixer 92 they have been sufficiently mixed to produce a cemented tailings backfill which is fed by gravity or pumped to underground workings through conduit means 102.

The system, as shown in FIG. 3, constitutes a batch plant as it takes between 3 to 8 hours, depending on the incoming material. If a mine requires a continuous system another silo equipped with the same working components is added and with the paste being fed in a similar manner into the same screw mixer 92. While the material in the first silo is being emptied, the material in the second silo is being thickened. The silos would obviously be sized to provide the require tons per hour output that the mine requires.

This system is designed to use total tailings but depends on the grind or fineness of the mill output. If the tailings are too fine, such as in the case of some gold mines, an optional agglomeration unit may be added to the system.

For varied reasons, total tailings as mine backfill material is not always desired. In mills that refine gold bearing ore, the ore must be ground to a very fine powder to allow complete extraction of the gold. The resulting tailings are extremely fine and the finer portions of this material is commonly referred to as "slimes" due to its consistency when wet. It requires more binder or cement to achieve the same strength as a coarser material. It also tends to leak out of an underground stope if the water content of the fill is too high.

It does however have a couple of advantages. If used in paste fill, it helps the paste to flow through the pipeline somewhat like a lubricant. If a total tailings is used, the paste usually has a lower moisture content.

When the finer portion of tailings is to be excluded from the backfill, a hydrocyclone or other such device may be used to separate or classify the finer and coarser materials. Most existing backfill plants will have a cyclone in place.

Figure 4:
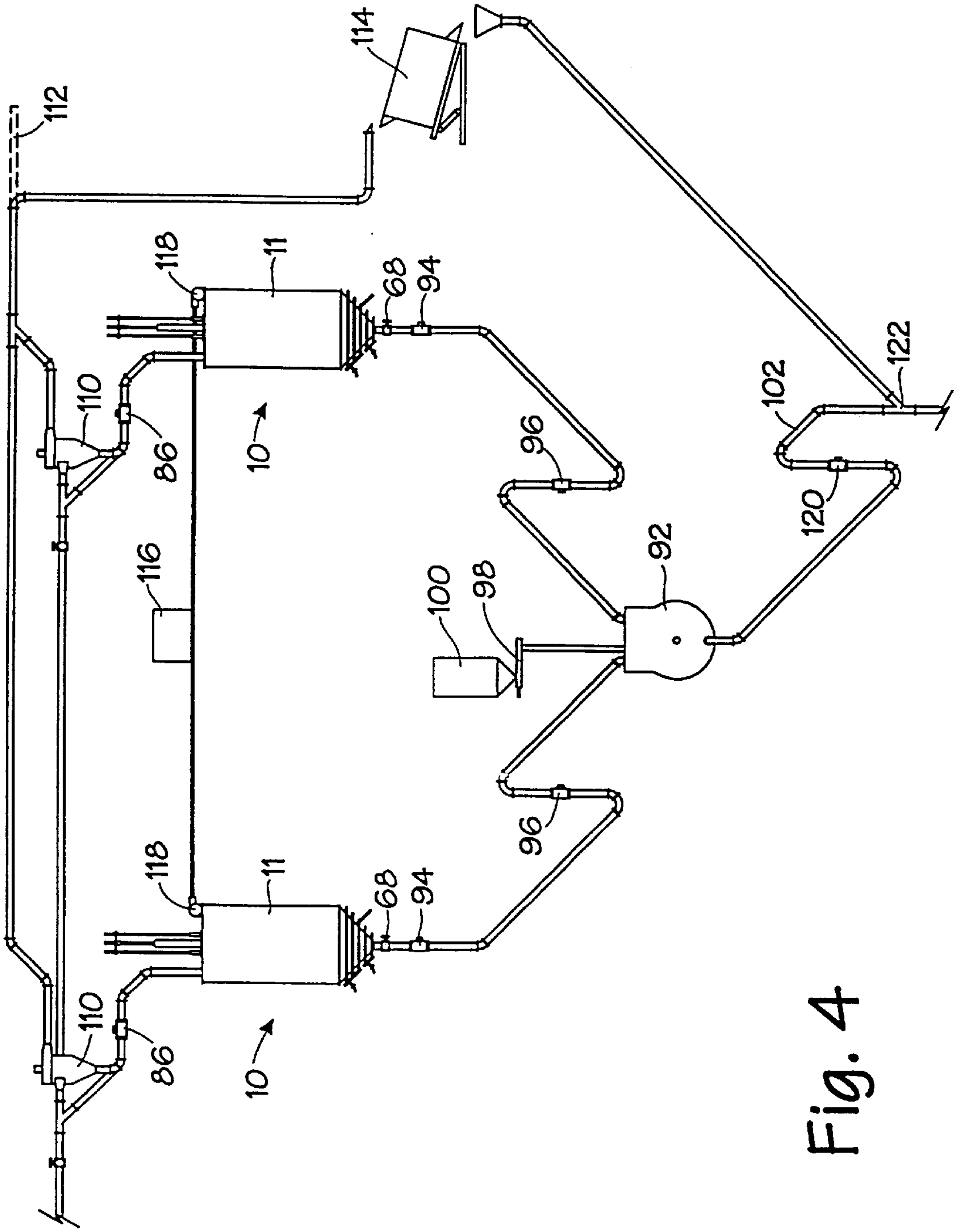
FIG. 4 is a schematic diagram of another high density slurry or paste backfill production facility which incorporates more than one of the first embodiment integral containment vessels and high density slurry or paste producing units.

FIG. 4 illustrates another backfill paste production facility which includes a pair of the integral containment vessels and high density slurry or paste producing units 10 for continuous paste backfill production. Regardless of its continuous production capabilities, the type of system illustrated in FIG. 4 is particularly useful if for any reason, a mine cannot use total tailings from the mill as backfill This system employs a hydrocyclone 110 at the top of each silo 11 to separate the finer material. The finer material, or slimes, can then be optionally pumped to a tailings pond via conduit 112 or where sending this fine material to the tailings pond is not acceptable, the cyclone overflow can be sent to an agglomeration plant 114. The agglomeration plant 114 is used to pelletize the fine materials and inject them into the mine backfill supply pipe 102 after the mixer 92 as will be explained in greater detail hereinbelow. The integration of the pelletized fine material with the paste or high density slurry results in a material having equal or better strength than the strength of the slurry or paste material alone.

In order to speed settling of the solids in the silos 11, a small amount of flocculent from flocculent tank 116 can be injected into the slurry during or before agitation. Since the quantity of flocculent required to be injected is relative to quantity of slurry in the silos 11, flocculent metering pumps 118 ensure that the right amount of flocculent is injected and on a continuous basis in accordance with the amount of slurry as detected by inflow meters 86. It will be appreciated that injecting flocculent at the same time that the slurry is being pumped into the silo 11 will tend to reduce the required agitation time.

The paste or high density slurry is produced in the silos 11 as explained above and in a manner so as to provide continuous consumption of the tailings and/or continuous production of paste backfill. Once the paste in the one silo has been fluidized, the valve respective 68 is opened to permit the paste to flow to mixer 92. Most types of mixers such as commercially available paddle type or passive mixers can be used in these systems although some consideration should be paid to the particle size distribution of the tailings material.

Cement or other binder(s) used for the cementation of the tailings can be stored in its own silo(s) 100 and delivered to the mixer 92 as required. The amount of binder to be added is determined by the strength requirements of the mine. Based thereon, the rate of addition of binder or setting agent is then dependent on the density and flow rate of the paste as measured by meters 96, 94, respectively. In addition to the density meters 96 which monitor the density of the paste material prior to the mixer, it is preferable to also include a density meter 120 after the mixer 92 to provide a final product density and valuable feedback to ensure the proper proportions of setting agent and, more importantly, the amount of water, are carefully controlled.

Valves used in controlling the flow of either slurries or paste should be of a type that allow opening to the same diameter as the pipe to which they are attached. Butterfly valves, for example, have the flap in the centre of the valve and, therefore, even when open, tend to plug the line very easily. The most satisfactory type of valve has been found to be a pneumatically actuated pinch valve which are available in almost any size.

As explained briefly above, the very fine materials or slimes from the total tailings can be pre-separated via hydrocyclones 110 and passed to the agglomeration plant 114 to be processed into pellets. The agglomerated material or pellets are then introduced into the system after the mixer 92 by means of a pellet injection 'Y' 122. The agglomeration plant 114 takes in the slimes, adds binders while tumbling, thus producing pellets. The pellets may be stored until hardened or cured then fed into system or they may be flash cured by means of a dryer upon exiting the agglomeration plant 114 and directly injected into the system. In general, the pellet injection 'Y' 122 uses gravity to feed the pellets into the mixer discharge line 102. However, advantage can be taken of the vacuum created at the 'Y' 122 when paste backfill is flowing down the line 102 under the influence of gravity.

Figure 5:
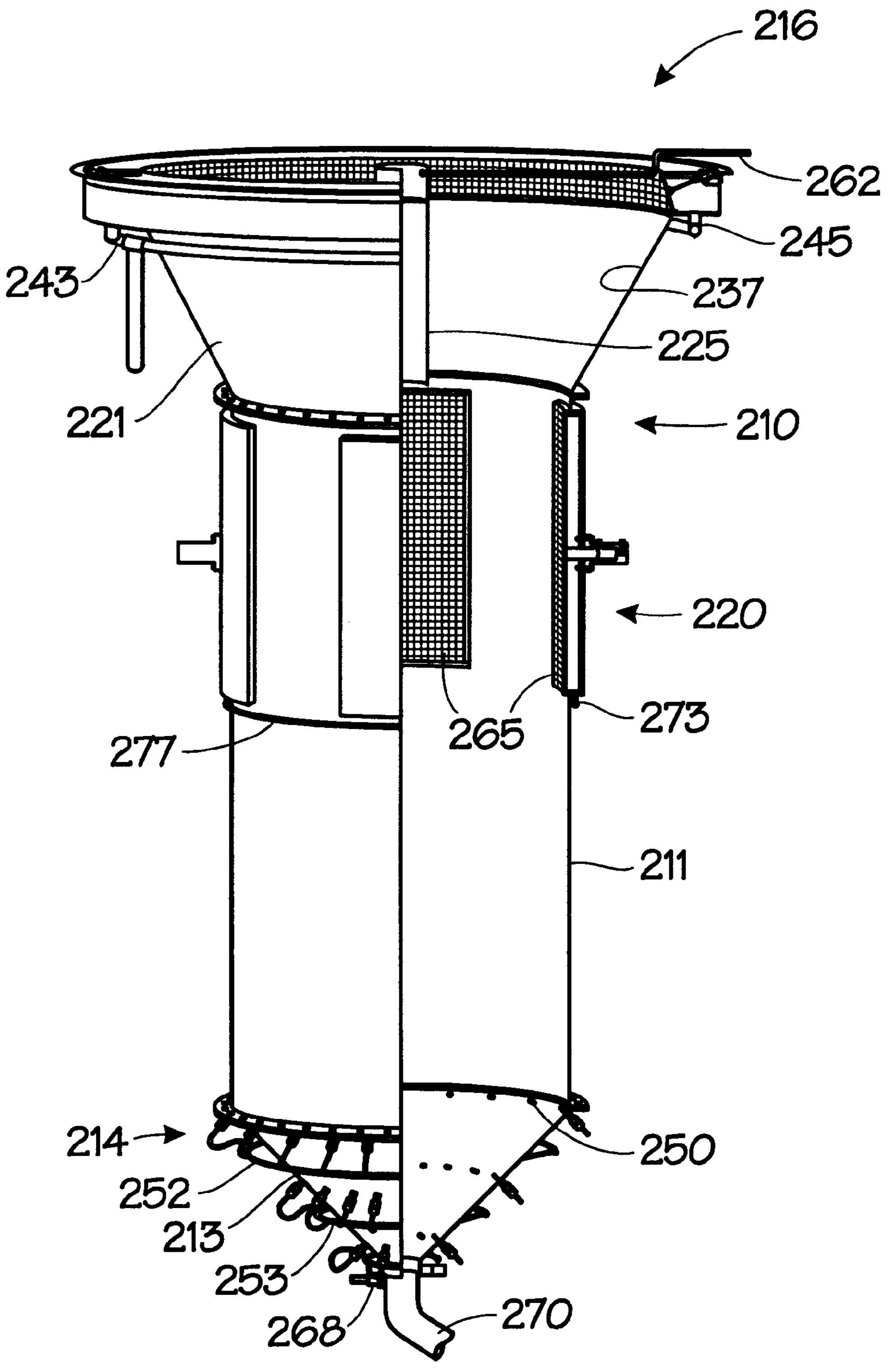
FIG. 5 is a side perspective view of the integral containment vessel and high density slurry or paste producing unit according to a second embodiment of the invention, partially broken away to reveal the interior and exterior features.
Figure 6:
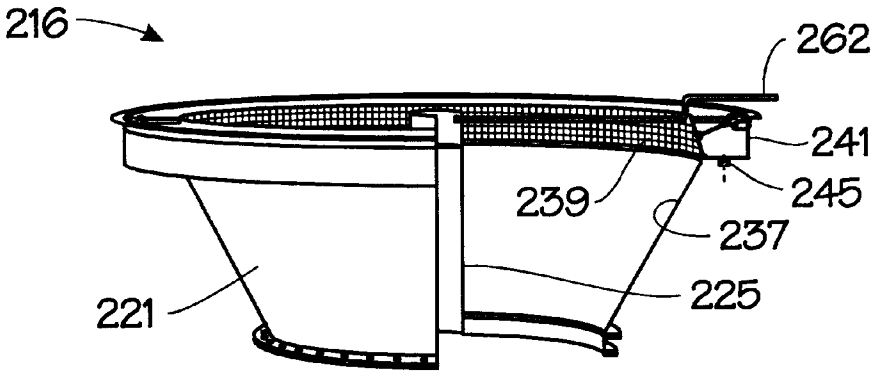
FIG. 6 is a side perspective view of the feed cone, feed well and launder tray section of the second embodiment as shown in FIG. 5 and similarly partially broken away.
Figure 7:
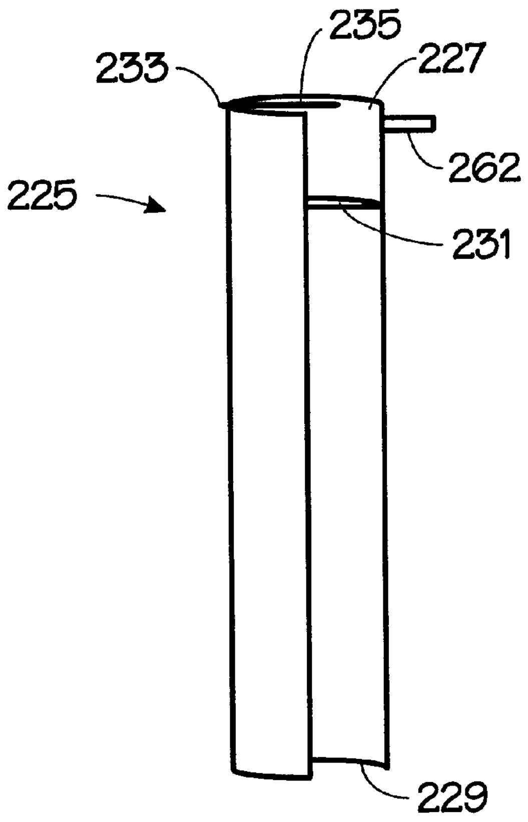
FIG. 7 is an enlarged, side perspective view of the feed well of the second embodiment, again being partially broken away for purposes of illustration.

A second embodiment of the integral containment vessel and high density slurry paste production apparatus is shown in FIG. 5 and generally denoted by reference numeral 210. The apparatus 210 is similar to the unit 10 illustrated in FIG. 1 (and may be substituted for the unit(s) 10 in the high density slurry or paste backfill production facilities of FIGS. 3 and 4), with the primary difference being that the percolation/decant insert 12 of the FIG. 1 unit 10 is replaced by separate percolation and decant apparatuses 220, 216 which perform generally the same respective functions. In addition, a feed cone 221 is provided at the top of the silo 211 which includes a feed well 225 disposed generally centrally thereof for introducing the raw slurry material. Details of the feed cone 221 and the feed well 225 are illustrated in FIGS. 6 and 7.

As with the silo 11 of the unit shown in FIG. 1, the shape and configuration of the silo body 211 and the bottom discharge cone 213 can be the same. Preferably, the silo body 211 has 2:1 aspect ratio (height:diameter) and the angle of the discharge cone 213 is approximately 45°. The high density slurry or paste production apparatus 210 includes an air/water fluidization/agitation system 214 disposed in the discharge cone 213 comprising a plurality of nozzles 250 which are supplied through manifolds 252 and 253 with air (or water) in the same manner as with the first embodiment shown in FIGS. 1, 2*a* and 2*b*. Similarly, a discharge valve 268 permits the densified slurry/paste to be removed from the containment vessel through outflow conduit 270.

The purpose of the feed well 225 is to eliminate or minimize turbulence in the vessel, thereby allowing the solids particles to settle out of suspension more quickly. The feed well 225 is also designed to aid in mixing chemical additives such as dispersant, flocculent, etc. with the incoming slurry feed, to speed the reaction of the chemical with the feed material.

In general the feed well 225 is a conduit, such as a cylinder or pipe, that is open at both ends 227, 229. The feed well 225 is mounted vertically in the centre of the feed cone 221, for example, by a bridge that runs across the top of the system (not shown). Preferably, the feed well diameter is about $1/10^{th}$ the diameter of the silo body 211. The length of the feed well 225 is approximately equal to the height of the feed cone 221. A grate 231 made of steel or other acceptable material is mounted inside the feed well 225 at a distance of about ¼ the total distance from the top to the bottom. Positioning nearer the top 227 permits ready access for removal of any accumulated debris. The openings of the grate 231 are sized according to the particle size distribution of the material including any foreign objects able to be pumped to the system as determined by laboratory testing.

A feed pipe 262 enters the feed well 225 at or near its upper end 227 above the grate 231. The feed pipe 262 must be sized according to the flow rate of the incoming material so as to ensure adequate throughput.

An optional chemical addition pipe 234 can enter the feed well 225 near the top 227 and into an additive diffuser 235, the type to be determined by what type of chemical is added. The addition of the chemical is through a metering pump as specified by the company supplying a particular chemical.

The feed cone 221 provides a greater area for settling out of solids from the slurry and also allows a greater area for the decanting of the water which is effected though the decanting apparatus 216 disposed at the top of the feed cone 221. Another advantage is that it allows the containment vessel to have more usable volume or height and thereby increases the consolidation of the solids. The walls 237 of the feed cone 221 are angled, preferably about 60° from horizontal, such that solid particles will flow down the walls into the silo body 211. The feed cone 221 may be bolted or otherwise affixed to the top of the silo body 211. Preferably, the feed cone 221 has an aspect ratio of 1:3 (height of feed cone:height of silo body).

The decanting apparatus 216 comprises a decant screen 239 and an associated launder tray 241 disposed about the periphery of the upper end of the feed cone 221. The purpose of the launder tray is simply to collect the supernatant water and to channel it to a common discharge piping system 243 (see FIG. 5). The launder tray 241 is separated from the feed cone 221 by the decant screen 239. Preferably, the launder 241 protrudes horizontally from the feed cone 221 at a ratio of about 1:15 (launder tray width:top of feed cone diameter). The height of the launder tray 241 is preferably about equal to its width. A plurality of outlets 245 are provided in the bottom of the launder tray 241 and attached together by an overflow discharge pipe 243 to remove the supernatant water from the vessel. The outlets 245 and the discharge pipe 243 should be sized to accept the maximum outflow of water from the system.

Around the inner circumference of the launder tray is a decant screen 239 that is preferably set at a 75° angle from the horizontal, sloping inward toward the centre of the feed cone 221. The purpose of the decant screen 239 is to hold back solids particles while allowing the supernatant water to flow through to the launder tray 241. The slightly downwardly facing screen 239 assists in preventing blockages since restrained particles will have the tendency to fall back into the feed cone 221 under the influence of gravity.

Figure 9:
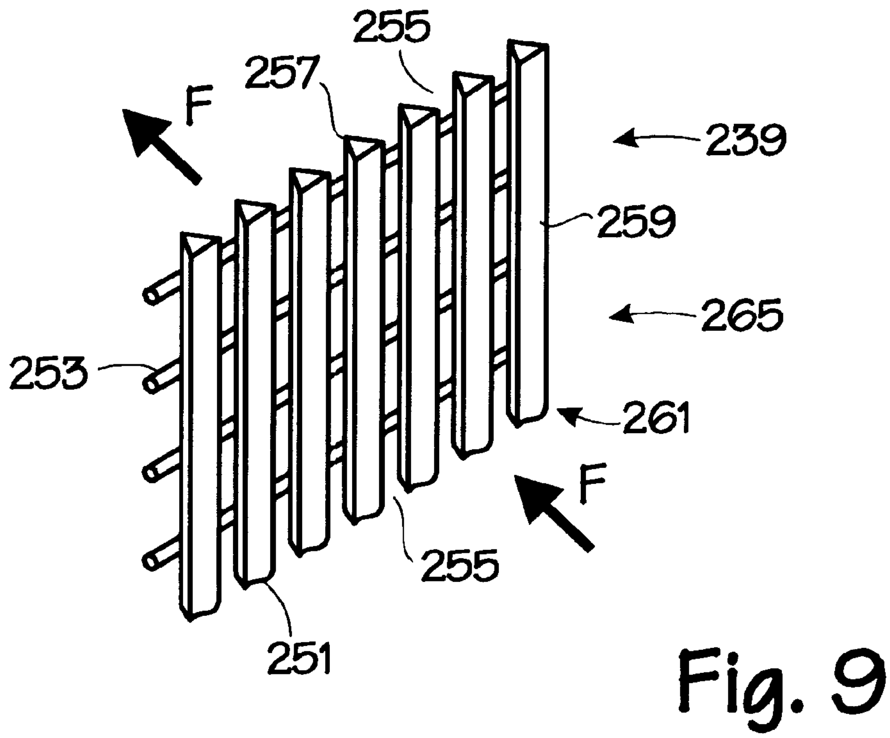
FIG. 9 is a magnified, perspective view of a portion of a screen useful in the present invention as a decant screen and/or a percolation screen.

Preferably, the decant screen 239 is a stainless steel, vertical rib, water-well-type screen (see FIG. 9) that is mounted within a frame 247*a*,247*b* for ease of replacement. The slot size of the screen 239 is selected relative to the particle size distribution of the material to be handled by the system and as determined through laboratory testing. As shown in FIG. 9, the preferred screen comprises a plurality of vertical triangular ribs 251 welded to a framework of horizontal bars 253 to provide a series of vertically-extending channels 255 which diverge in the direction of flow F. The ribs 251 are affixed to the bars 253 along one of their apexes 257 such that the sides 259 of the ribs 251 opposite the apex 257 form a generally flat, upstream surface 261 which, together with the vertical divergent channels 255, minimize the propensity of particles becoming lodged between the ribs 251.

Figure 8:
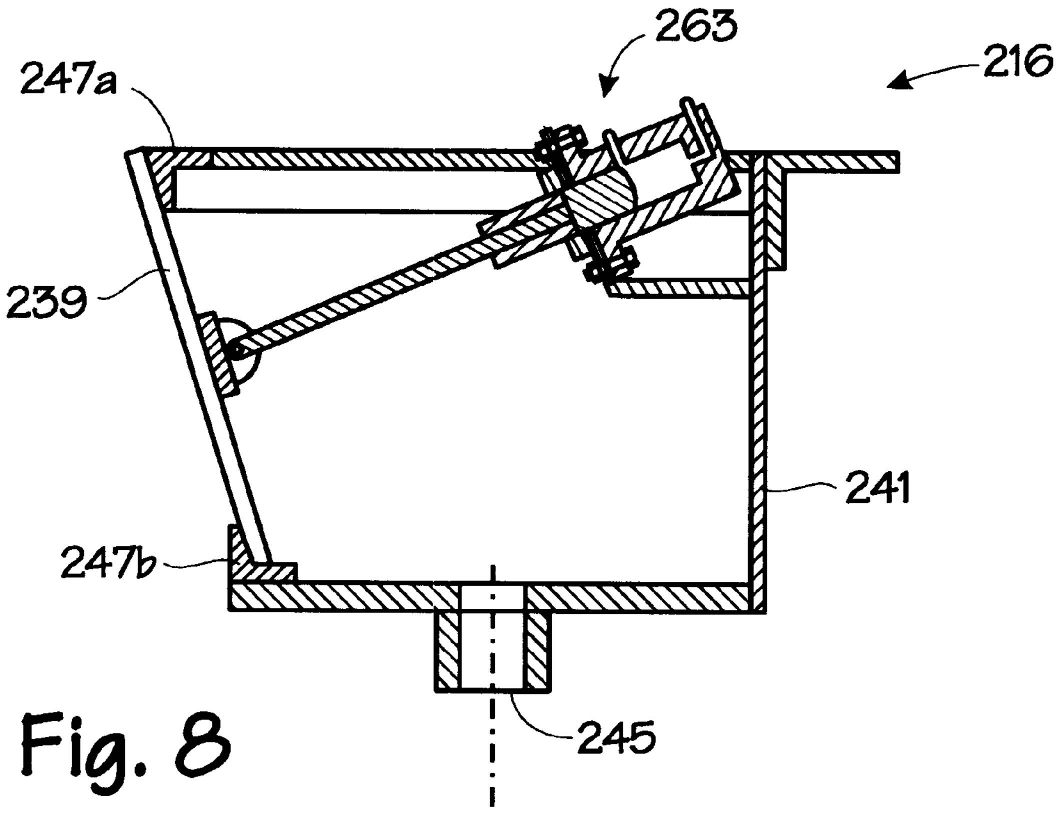
FIG. 8 is an enlarged, cross-sectional view of the launder tray which is used to decant water from the containment vessel.

To further prevent blockages from occurring on the decant screen 239, a plurality of pneumatic hammers 263, numbering for example 3 to 8, are provided spaced about the launder tray frame 247*a* and attached to the decant screen 249 (see FIG. 8). The screen 239 is cleaned by intermittent operation of a pneumatic hammer type vibrator 249 that vibrates the screen 239 periodically to dislodge any entrained solids particles that can impede the flow of water through the screen 239.

Figure 10:
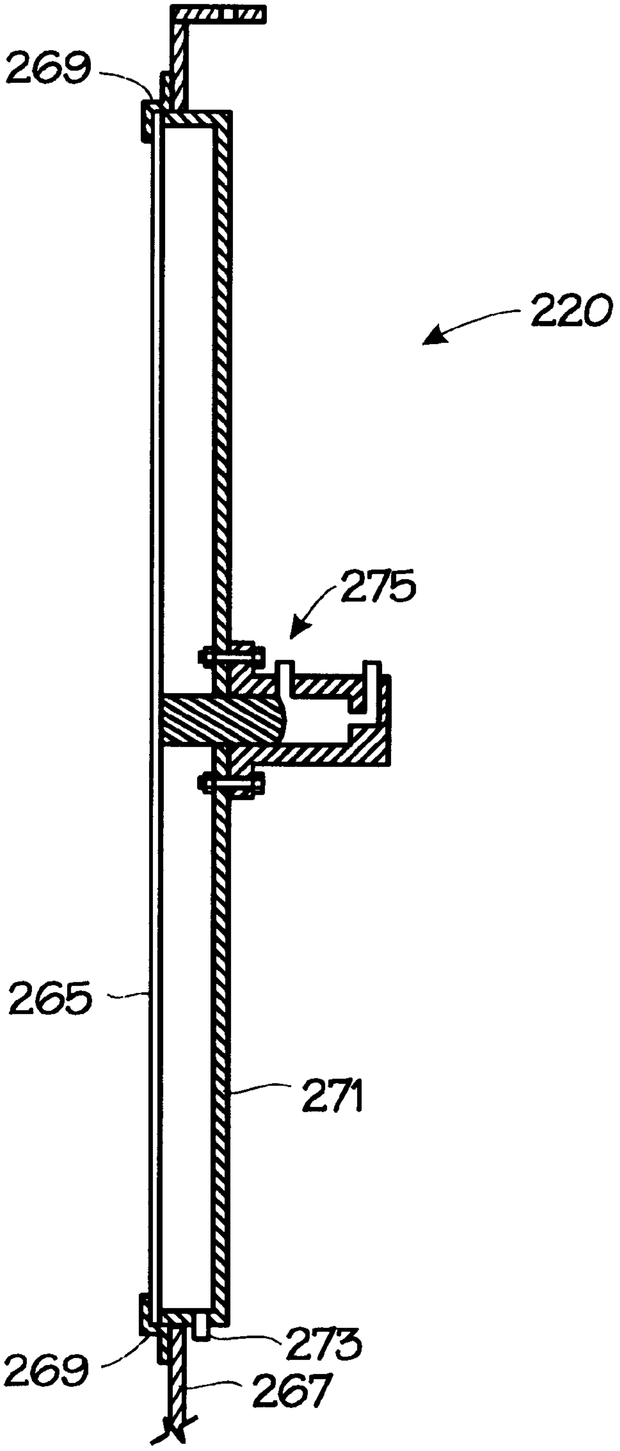
FIG. 10 is an enlarged, cross-sectional view of the percolation apparatus of the second embodiment of the invention.

The percolation apparatus of this embodiment is shown generally in FIG. 5 and in detail in FIG. 10 and comprises a plurality of percolation screens 265 arranged around the inner circumference of the silo body 211, near its top, in apertures in the silo body wall 267. Preferably, the height of these screens 265 is approximately one third the total height of the silo body 211. The percolation screens 265 are mounted in a frame 269 for ease of replacement. A tank-like enclosure 271 protrudes from the silo body 211 behind each screen 265 to contain the percolation water and direct it to an opening 273 in the bottom of the enclosure 271 for discharge. The enclosure 271 also provides a mounting for a pneumatic hammer-type vibrator 275 for dislodging of solids particles from the screen 265.

Preferably, the percolation screen 265 is a stainless steel, vertical rib, water-well-type screen of the same type as used for the decant screen 239 (see FIG. 9) with the slots sized according to the particle size distribution of the solids particles. This slot sizing may be determined through laboratory testing.

During initial filling of the silo 211, the percolation screens 265 act in the same way as the decant screen 239 by permitting water to escape therethrough. However, once the slurry has risen to approximately the top of the feed cone 221 where the decanting screens 239 become operational, the percolation screens 265 then have a higher solids concentration with which to deal. Their main purpose is to allow any water that is displaced from the pores or voids in the solids mass of the slurry/paste to escape from the vessel, thereby speeding the consolidation of the material.

Preferably, at least four percolation screens 265 are installed in each system but the number of screens 265 can be higher depending on the particle size distribution, specific gravity and settling density test results as determined through specific laboratory testing.

In operation, the mill or mine tailings are pumped in a slurry form (as they are when they leave the mineral processing circuit) directly from the mine's mill, to the backfill plant. The slurry enters the system 210 through the slurry feed line 262 into the feed well 225.

The feed well 225 channels the slurry downward into the centre of the silo 211. The introduction of the slurry material centrally of the silo 211 through the feed well 225 is less important during initial filling than when the silo/feed cone 211,221 is full of slurry and/or after dewatering has commenced. Once settling has commenced, if the inflow is just dumped indiscriminately into the silo 211, it tends to stir up the entire mass and slows the settling of solids. However, by feeding the silo 211 through the feed well 225, the slurry is deposited well below the surface (which is at the level of the decant screen 239), thereby speeding the settling of the solids and eliminating turbulence.

Should the materials properties be such that a flocculent, dispersant, or other chemical additive is necessary to speed the settling process, such additive can be introduced through the additive inlet 233 and dispersed in the feed well 225 by diffuser 235 (see FIG. 7). The additive may be dispensed by a metering pump, as specified by the chemical supplier. The chemical additive would mix with the incoming tailings slurry in the feed well 225 as the slurry rebounds from the diffuser grating 231.

As the tailings slurry rises in the silo 211, it will eventually reach the level of the percolation screens 265. At this point, water will begin to flow through the percolation screens 265 while the solids will be retained in the silo 211. The water is collected by a circumferential pipe 277 that is connected to the percolation discharge outlets 273 at the base of the percolation water collector or enclosure (see FIG. 5).

The channels 255 in percolation screens 265 tend to become blocked with agglomerated solids particles and occasionally need to be cleaned. This is accomplished through intermittent activation of the pneumatic vibrating hammer 275 that is attached to each percolation screen 265 (see FIG. 10).

When the slurry level reaches the level of the decant screen 239 at the top of the feed cone 221, the water will begin to flow through the decant screen 239 in the same way as with the percolation screens 265. At this point, the input of fresh slurry material is controlled to ensure the slurry material in the vessel does not overflow the decant screen 239. As mentioned above, the decant screen 239 is angled inward at the top to help prevent solids particles from adhering thereto (see FIG. 8). However, if the decant screens 239 become blocked, the pneumatic vibrating hammers 263 are operated periodically to clear the screen 239 of any particles that may have adhered.

The water flows through the decant screens 239 into the launder tray 241, then flows through the overflow discharge outlet 245 and into a circumferential collector pipe 243.

While this system is being filled with tailings slurry, solids are continuously settling in the water and therefore the slurry becomes thicker and hence, coarser at the bottom of the silo 211. The pressure caused by the weight of the water/solids mixture in the feed cone 221, tends to compact the lower layer of thickening material, thereby squeezing water out of the pores or voids in the solids mass. This pore water or percolation water is forced through the percolation screens 265.

Once the solids become sufficiently dense in the feed cone 221 (this varies according to the material properties), a valve (not shown) on the feed line 262 is closed and the flow of slurry is diverted. The supernatant water will continue to be decanted until the surface level of the material falls below the bottom of the decant screens 239. The percolation screens 265 continue to allow water to escape from the material until a predetermined solids density has been attained. Then, to maintain a specific water/solids ratio, valves (not shown) which prevent further water from exiting the percolation discharge outlets 273 are closed.

The system is left in a static state, allowing the settling and consolidation process to continue.

As mentioned earlier, the coarser material tends to settle first, giving a graduated solids mass in the silo. To achieve an homogeneous paste from the system, pressurized air is released through the fluidization nozzles 250 located in the discharge cone 213. This fluidization process continues for a predetermined period of time (again depending on the material properties), until the material becomes a uniformly-graded paste. The discharge valve 268 is throttled open to allow a predetermined rate of flow and the paste material makes its way, for example, to the mixer 92 (as shown in FIGS. 3 or 4). As soon as the flow rate from the discharge cone 213 is consistent, the fluidization air is turned off.

There has been shown and described above two embodiments of an integral containment vessel and high density slurry or paste producing unit, a method for producing high density slurry and/or paste backfi, and examples of associated plant facilities which incorporates both of these aspects of the invention. It will be appreciated that various modifications and/or substitutions can be effected within the present technology without departing from the spirit or scope of the claims as appended hereto.

We claim:

1. A high density slurry or paste production apparatus for producing high density slurry or paste from mine tailings, wherein the mine tailings comprise a mixture of solids and water, with the solids being settlable in the water under the influence of gravity, said apparatus comprising:

a containment vessel into which a quantity of mine tailings can be input;

means for percolating water from the mixture as the solids are settling;

means for decanting clarified water from the surface of the mixture when the solids have substantially settled to produce a high density slurry or paste from the settled solids, said means for decanting clarifed water being disposed about a peripheral portion of said containment vessel;

means for introducing said mixture into said containment vessel at a level below said peripheral portion of said containment vessel; and means for injecting air into the mixture to agitate the solids while they are settling and for air fluidizing the high density slurry or paste to enable the high density slurry or paste to be removed from the vessel under the influence of gravity.

2. The apparatus as claimed in claim 1, wherein said means for percolating water from the mixture comprises a plurality of percolation screens through which said water can percolate and through which said solids are substantially impassable, said percolation screens being disposed in one or more walls of the containment vessel, each said percolation screen having associated therewith means for removal of the water which flows therethrough.

3. The apparatus as claimed in claim 2, wherein said means for removal of the water which flows through the percolation screens comprises a screen enclosure having an outlet through which said water is drained.

4. The apparatus as claimed in claim 3, wherein the outlet of said screen enclosure for each said percolation screen is connected to a common collection conduit.

5. The apparatus as claimed in claim 2, further comprising means for removing solids which become clogged in any passages in each percolation screen.

6. The apparatus as claimed in claim 5, wherein said means for removing solids which may be clogging any passages in each percolation screen comprises means for intermittently vibrating said percolation screen.

7. The apparatus as claimed in claim 6, wherein said means for intermittently vibrating said percolation screen comprises a vibrating pneumatic hammer.

8. The apparatus as claimed in claim 1, wherein said means for injecting air into the mixture to agitate the solids while they are settling and for air fluidizing the high density slurry or paste to enable the high density slurry or paste to be removed from the vessel under the influence of gravity comprises a plurality of air nozzles disposed at or near the bottom of the vessel, and means for selectively conducting air under pressure from a source to said plurality of mixture agitating air nozzles.

9. The apparatus as claimed in claim 8, wherein said air nozzles are insertable through fittings into the vessel and lockable therein, and wherein said air under pressure is communicated to said plurality of air nozzles via a manifold which is located exteriorly of the vessel.

10. The apparatus as claimed in claim 1, wherein said means for decanting clarified water from the surface of the mixture comprises a decant screen through which said water is passable and through which said solids are substantially impassable, said decant screen having associated therewith means for removal of the water which flows therethrough.

11. The apparatus as claimed in claim 10, wherein said decant screen is angled inwardly of the containment vessel.

12. The apparatus as claimed in claim 11, wherein each outlet of said launder tray screen is connected to a common collection conduit.

13. The apparatus as claimed in claim 10, wherein said means for removal of the water which flows through the decant screen comprises a launder tray having at least one outlet through which said water is drained.

14. The apparatus as claimed in claim 10, further comprising means for removing solids which become clogged in any passages in the decant screen.

15. The apparatus as claimed in claim 14 wherein said means for removing solids which may be clogging any passages in said decant screen comprises means for intermittently vibrating said decant screen.

16. The apparatus as claimed in claim 15, wherein said means for intermittently vibrating said decant screen comprises at least one vibrating pneumatic hammer.

17. The apparatus as claimed in claim 1, wherein the containment vessel comprises:

a generally cylindrical silo having a top and a generally closed bottom; and a frustoconical feed cone extending upwardly and outwardly from the top of the silo.

18. The apparatus as claimed in claim 17 wherein said peripheral portion of said containment vessel whereat said means for decanting water is disposed is an upper circumferential edge of said feed cone.

19. The apparatus as claimed in claim 18, wherein said means for decanting clarified water from the surface of the mixture comprises a decant screen through which said water is passable and through which said solids are substantially impassable, said decant screen having associated therewith means for removal of the water which flows therethrough.

20. The apparatus as claimed in claim 19, wherein said means for percolating water from the mixture comprises a plurality of percolation screens spaced circumferentially about the cylindrical wall of said silo through which said water can percolate and through which said solids are substantially impassable, each said percolation screen having associated therewith means for removal of the water which flows therethrough.

21. The apparatus as claimed in claim 20, wherein said means for introducing said mixture into said containment vessel comprises a feed conduit extending the height of said feed cone and generally centrally with respect to said silo, said conduit having an upper inlet through which said mixture is fed and a lower outlet through which said mixture enters the vessel.

22. The apparatus as claimed in claim 21, further comprising a feed line for feeding said mixture into said feed conduit.

23. The apparatus as claimed in claim 21, further comprising means for adding a predetermined quantity of additive to the mixture in said feed conduit.

24. The apparatus as claimed in claim 23, wherein said feed conduit includes a grate through which said additive and said mixture flow to enhance their mixing.

25. The apparatus as claimed in claim 21, further comprising means for adding a predetermined quantity of additive containing a flocculent and/or a dispersant.

26. The apparatus as claimed in claim 21, wherein said percolation screens extend about $\frac{1}{3}^{rd}$ the height of the silo.

27. The apparatus as claimed in claim 21, wherein the height of the silo is about twice its diameter.

28. The apparatus as claimed in claim 21, wherein the bottom of the silo is conical and downwards convergent, and having a valved discharge conduit through which said high density slurry or paste is selectively removable from said containment vessel.

29. The apparatus as claimed in claim 21, wherein the feed cone diverges from the top of the silo at an angle of approximately 60° from horizontal.

30. The apparatus as claimed in claim 21, wherein the height of the feed cone is about $1/3^{rd}$ the height of the silo.

31. The apparatus as claimed in claim 21, wherein said feed conduit is cylindrical and has a diameter of about $1/10^{th}$ the diameter of the circumferential edge of the feed cone.

32. The apparatus as claimed in claim 21, wherein said decant screen is angled inwardly towards the center of the feed cone.

33. The apparatus as claimed in claim 32, wherein the angle at which said decant screen is angled is about 75° from horizontal.

34. The apparatus as claimed in claim 21, wherein said means for removal of the water which flows through the percolation screen comprises a screen enclosure having an outlet through which said water is drained.

35. The apparatus as claimed in claim 34, wherein the outlet of said screen enclosure for each said percolation screen is connected to a common collection conduit.

36. The apparatus as claimed in claim 21, further comprising means for removing solids which become clogged in any passages in each percolation screen.

37. The apparatus as claimed in claim 36, wherein said means for removing solids which may be clogging any passages in each percolation screen comprises means for intermittently vibrating said percolation screen.

38. The apparatus as claimed in claim 37, wherein said means for intermittently vibrating said percolation screen comprises a vibrating pneumatic hammer.

39. The apparatus as claimed in claim 21, wherein said means for removal of the water which flows through the decant screen comprises a launder tray having at least one outlet through which said water is drained.

40. The apparatus as claimed in claim 39, wherein the width of said launder tray is about equal to the height of the decant screen.

41. The apparatus as claimed in claim 39, wherein the width of the launder tray is about $1/15^{th}$ of the diameter of the circumferential edge of the feed cone.

42. The apparatus as claimed in claim 39, wherein each outlet of said launder tray screen is connected to a common collection conduit.

43. The apparatus as claimed in claim 21, further comprising means for removing solids which become clogged in any passages in the decant screen.

44. The apparatus as claimed in claim 43, wherein said means for removing solids which may be clogging any passages in said decant screen comprises means for intermittently vibrating said decant screen.

45. The apparatus as claimed in claim 44, wherein said means for intermittently vibrating said decant screen comprises at least one vibrating pneumatic hammer.

46. The apparatus as claimed in claim 21, wherein said means for injecting air into the mixture to agitate the solids while they are settling and for air fluidizing the high density slurry or paste to enable the high density slurry or paste to be removed from the vessel under the influence of gravity comprises a plurality of air nozzles disposed at or near the bottom of the vessel, and means for selectively conducting air under pressure from a source to said plurality of mixture agitating air nozzles.

47. The apparatus as claimed in claim 46, wherein said air nozzles are insertable through fittings into the vessel and lockable therein, and wherein said air under pressure is communicated to said plurality of air nozzles via a manifold which is located exteriorly of the vessel.

* * * * *